Jan. 1, 1929.
G. HARVIS
1,696,953
ELECTRIC SHAVING CUP
Filed March 23, 1928
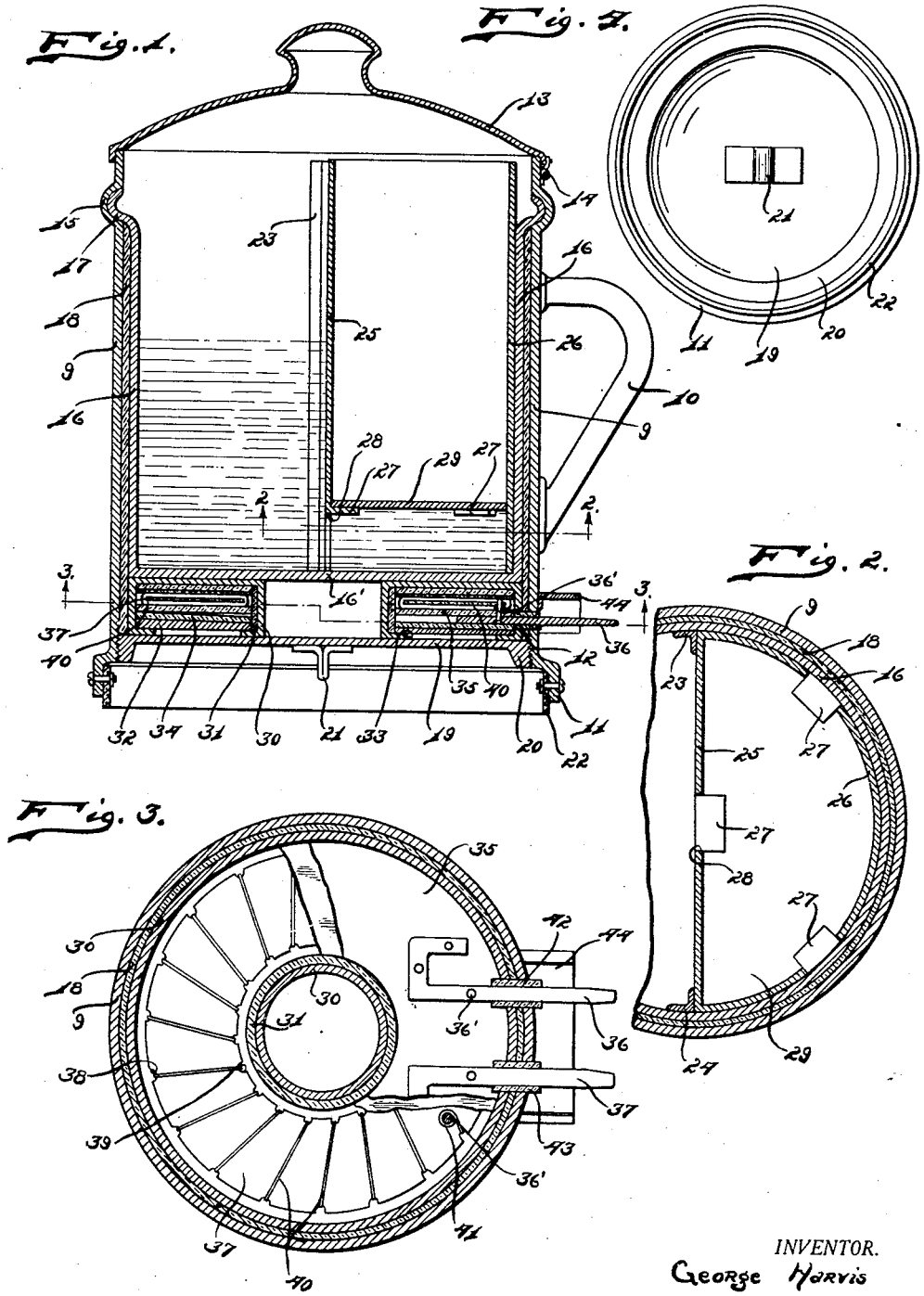
INVENTOR.
George Harvis
BY Thos. S. Donnelly
ATTORNEY.

Patented Jan. 1, 1929.

1,696,953

UNITED STATES PATENT OFFICE.

GEORGE HARVIS, OF DETROIT, MICHIGAN.

ELECTRIC SHAVING CUP.

Application filed March 23, 1928. Serial No. 264,091.

My invention relates to a new and useful improvement in an electric shaving cup, and has for its object the provision of a shaving cup in which a quantity of water may be heated by electricity and in which there will be provided a compartment for containing the shaving soap.

It is another object of the invention to provide a device of this class which will be simple in structure, economical of manufacture and highly efficient in use.

Another object of the invention is the provision of a shaving cup of this class which will be sanitary and in which the structure is such that the soap container may be removed therefrom for cleaning, when desired.

Other objects will appear hereinafter.

The invention consists in the combination and arrangement of parts hereinafter described and claimed.

The invention will be best understood by a reference to the accompanying drawings, which form a part of this specification and in which, Fig. 1 is a central vertical sectional view of the invention.

Fig. 2 is a fragmentary sectional view taken on line 2—2 of Fig. 1.

Fig. 3 is a sectional view taken on line 3—3 of Fig. 1 with parts broken away.

Fig. 4 is a bottom plan view of the invention.

In the invention I provide a cylindrical casing or outer shell 9, attached to the periphery of which is a suitable handle 10. The lower end of the shell or outer casing 9 is offset as at 11 and provided with a portion 12 above the offset portion which is interiorly threaded. A cover 13 is hingedly mounted at 14 on the outer casing or shell 9. A peripheral bead 15 is formed on this casing. A container 16 which is formed cup-shaped, is adapted for mounting within the casing or outer shell 9 and is provided at its open end with a peripheral bead 17 adapted to engage the bead 15. A layer 18 of suitable insulating material, such as asbestos, serves to separate the outer casing of the container 16. A disc 19 provided with a peripheral ring 20 which is threaded on its periphery is used as a closure for the outer casing or shell 9. A supporting ring 22 is secured to the inner surface of the offset portion 11 and serves as a support for the device.

In order to rotate the disc 19 for threading and unthreading, a hand grip 21 is welded, soldered or otherwise suitably secured to the undersurface of the disc 19. Mounted on the inner surface of the cup-shaped member 16 and extending vertically at substantially diametrically opposite points, are angle irons 23 and 24. A soap container is provided which constitutes a flat wall 25 and an arcuate wall 26, these parts being preferably made integral. The flat wall 25 engages one side of the angle irons 23 and 24. Punched from the walls 26 and 25, adjacent the lower end thereof, are tongues 27 which serve to engage and support the bottom 29 of this soap container.

In use, water is poured into the container 16 and through the opening 28 formed where one of the tongues 27 is punched therefrom. This water has access to the space below the bottom 29.

The closure 19, as shown in Fig. 1, is in spaced relation to the bottom 16' of the container 16. Positioned in this space between the disc 19 and the bottom 16' is a hollow ring 30, in which is positioned an insulating ring 31, preferably made from fibre. A ring of metal 32 is positioned on the base of this ring which is cut away as at 33, and engaging this ring is a layer 34 of insulating material such as fibre. Positioned upon this layer is a layer 35 of fibre and spaced therefrom are the terminals 36 and 37 which are projected between these layers and secured to the layer 35 by the stud 36' which is projected through the layer 35 and serves as a terminal for the electric heating element used in the invention.

A ring 37 of mica is provided with peripheral notches 38 and the notches 39 on the inner side thereof. Wound around this ring 37 and engaging in the notches is an electric heating element or wire 40, one end 41 of which is attached to the stud 36' of the terminal 37, the other end of the wire being attached by a suitable terminal to the contact 36. These members 36 and 37 are projected interiorly of the casing 9 through insulating sleeves 42 and 43 so as to terminate slightly beyond the end of a shield 44 mounted on the casing 9.

The construction and arrangement is such that water placed in the container 16 may be heated very quickly to the desired temperature by connecting the contacts or terminals 36 and 37 to the electric service connections usually found in modern homes. The soap may be placed in the soap container and thus the advantages of hot water at the time of shaving obtained when hot water is otherwise unavailable.

In view of the fact that but a small amount of water is used by a person shaving, the cup will afford sufficient capacity to meet these needs, and the presence of the soap in the soap container makes a compact structure which may be transported from place to place.

This soap container is merely slid downwardly in the container 16 behind the guides 23 and 24 and may be removed from the container when desired for cleaning and for other purposes.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A device of the class described, comprising: a container; an outer casing for the reception of said container, the periphery of said container being spaced from the inner surface of said outer casing; insulating material positioned in said space; a heating element mounted in said outer casing for engaging the base of said container and supporting the same; axially extending guide members mounted on the inner surface of said container; a soap container positioned in said container and engaging at one side said guide members; and a bottom in said soap container spaced above the end thereof, the space thereunder communicating with the interior of said container.

2. A device of the class described, comprising: an outer casing having a peripheral bead formed adjacent its upper end to provide a circumferential groove on its inner face; a container mounted in said casing and having its periphery spaced from the inner surface of said casing; insulating material mounted in said space; and a peripheral bead on the open end of said container engaging in said groove on said casing for locking said container and said casing in fixed relation.

3. A device of the class described, comprising: an outer casing having a peripheral bead formed adjacent its upper end to provide a circumferential groove on its inner face; a container mounted in said casing and having its periphery spaced from the inner surface of said casing; insulating material mounted in said space; a peripheral bead on the open end of said container engaging in said groove on said casing for locking said container and said casing in fixed relation, the bottom of said container being spaced from the bottom of said casing; and an electric heating element mounted in said space.

4. A device of the class described, comprising: a cylindrical casing; a closure for one end of said casing, said casing being interiorly threaded adjacent one end; an enlargement on one face of said closure at the periphery thereof, having its periphery threaded for threading into said casing; a heating element supported by said closure; a container positioned in said casing and resting upon said heating element; axially extended guide members on the inner surface of said container; a soap container having one side to conform to the inner surface of said container and the other side flat, said flat side engaging said guide members, said guide members serving to retain the curled portion of said soap container in engagement with the inner surface of said container.

5. In a device of the class described, a cylindrical container; axially extending guide strips on the inner surface thereof at substantially diametrically opposite positions; a substantially semi-cylindrical soap container slidably positioned in said container and engaging at its flat side said guide strips and engaging throughout its curled side the inner surface of said container.

6. In a device of the class described, a cylindrical container; axially extending guide strips on the inner surface thereof at substantially diametrically opposite positions; a substantially semi-cylindrical soap container slidably positioned in said container and engaging at its flat side said guide strips and engaging throughout its curled side the inner surface of said container; and a bottom in said soap container spaced from the lower end thereof, the space below the same communicating with said container.

In testimony whereof I have signed the foregoing specification.

GEORGE HARVIS.